United States Patent
Per et al.

(10) Patent No.: US 11,042,309 B1
(45) Date of Patent: Jun. 22, 2021

(54) RECOVERY OF VIRTUAL MACHINE FILES USING DISK ATTACHMENT

(71) Applicants: Yuri Per, Moscow Region (RU); Maxim V. Lyadvinsky, Moscow (RU); Serguei M. Beloussov, Costa del Sol (SG); Dmitry Egorov, Moscow Region (RU); Sergey Kandaurov, Nizhny Novgorod (RU)

(72) Inventors: Yuri Per, Moscow Region (RU); Maxim V. Lyadvinsky, Moscow (RU); Serguei M. Beloussov, Costa del Sol (SG); Dmitry Egorov, Moscow Region (RU); Sergey Kandaurov, Nizhny Novgorod (RU)

(73) Assignee: ACRONIS INTERNATIONAL GMBH

( * ) Notice: Subject to any disclaimer, the term of this patent is extended or adjusted under 35 U.S.C. 154(b) by 0 days.

(21) Appl. No.: 14/320,510

(22) Filed: Jun. 30, 2014

Related U.S. Application Data (60) Provisional application No. 61/869,467, filed on Aug. 23, 2013, provisional application No. 61/869,470, filed on Aug. 23, 2013, provisional application No. 61/869,480, filed on Aug. 23, 2013.

(51) Int. Cl.
| | |
|---|---|
| *G06F 12/00* | (2006.01) |
| *G06F 12/08* | (2016.01) |
| *G06F 13/00* | (2006.01) |
| *G06F 3/06* | (2006.01) |
| *G06F 11/14* | (2006.01) |

(52) U.S. Cl.
CPC .......... *G06F 3/0619* (2013.01); *G06F 3/0647* (2013.01); *G06F 3/0664* (2013.01); *G06F 3/0683* (2013.01); *G06F 11/1469* (2013.01)

(58) Field of Classification Search
CPC ..................................................... G06F 3/065
USPC ....................................................... 711/162
See application file for complete search history.

(56) References Cited

U.S. PATENT DOCUMENTS

| | | | |
|---|---|---|---|
| 7,039,778 B2 * | 5/2006 | Yamasaki | G06F 11/2071 707/999.202 |
| 7,047,380 B2 | 5/2006 | Tormasov et al. | |
| 7,246,211 B1 | 7/2007 | Beloussov et al. | |
| 7,275,139 B1 | 9/2007 | Tormasov et al. | |
| 7,281,104 B1 | 10/2007 | Tsypliaev et al. | |
| 7,318,135 B1 | 1/2008 | Tormasov et al. | |
| 7,353,355 B1 | 4/2008 | Tormasov et al. | |

(Continued)

*Primary Examiner* — Mohamed M Gebril
(74) *Attorney, Agent, or Firm* — K&L Gates LLP (57) ABSTRACT

A method, computer program product, computing system, and system for recovery of virtual machine files are described. The method may include creating a backup archive file, the backup archive file including a backup of a first virtual disk corresponding to a virtual machine hosted by a virtualization host device. The method may further include storing the backup archive file including the backup. The method may also include creating a second virtual disk that emulates the first virtual disk using data from the backup archive file. The method may additionally include communicatively attaching the second virtual disk to the virtual machine hosted by the virtualization host device. Moreover, the method may include transferring data from the second virtual disk to the first virtual disk corresponding to the virtual machine hosted by the virtualization host device.

10 Claims, 5 Drawing Sheets

(56) References Cited

U.S. PATENT DOCUMENTS

| | | | |
|---|---|---|---|
| 7,366,859 B2 | 4/2008 | Per et al. | |
| 7,373,640 B1 * | 5/2008 | English | G06F 8/456 712/203 |
| 7,475,282 B2 | 1/2009 | Tormasov et al. | |
| 7,603,533 B1 | 10/2009 | Tsypliaev et al. | |
| 7,636,824 B1 | 12/2009 | Tormasov | |
| 7,650,473 B1 | 1/2010 | Tormasov et al. | |
| 7,721,138 B1 | 5/2010 | Lyadvinsky et al. | |
| 7,779,221 B1 | 8/2010 | Tormasov et al. | |
| 7,831,789 B1 | 11/2010 | Tsypliaev et al. | |
| 7,886,120 B1 | 2/2011 | Tormasov | |
| 7,895,403 B1 | 2/2011 | Tormasov et al. | |
| 7,934,064 B1 | 4/2011 | Per et al. | |
| 7,937,612 B1 | 5/2011 | Tormasov et al. | |
| 7,949,635 B1 | 5/2011 | Korshunov et al. | |
| 7,953,948 B1 | 5/2011 | Dyatlov et al. | |
| 7,979,690 B1 | 7/2011 | Dyatlov et al. | |
| 8,005,797 B1 | 8/2011 | Chepel et al. | |
| 8,051,044 B1 | 11/2011 | Dyatlov et al. | |
| 8,060,476 B1 * | 11/2011 | Afonso | G06F 11/1451 707/649 |
| 8,069,320 B1 | 11/2011 | Per et al. | |
| 8,073,815 B1 | 12/2011 | Korshunov et al. | |
| 8,074,035 B1 | 12/2011 | Per et al. | |
| 8,117,168 B1 * | 2/2012 | Stringham | G06F 11/1451 707/646 |
| 8,145,607 B1 | 3/2012 | Korshunov et al. | |
| 8,180,984 B1 | 5/2012 | Per et al. | |
| 8,225,133 B1 | 7/2012 | Tormasov et al. | |
| 8,261,035 B1 | 9/2012 | Tormasov et al. | |
| 8,296,264 B1 | 10/2012 | Dyatlov et al. | |
| 8,312,259 B1 | 11/2012 | Dyatlov et al. | |
| 8,347,137 B1 | 1/2013 | Chepel et al. | |
| 8,484,427 B1 | 7/2013 | Lyadvinsky et al. | |
| 8,504,785 B1 * | 8/2013 | Clifford | G06F 11/3485 711/161 |
| 8,566,542 B1 * | 10/2013 | Wang | G06F 11/1456 711/162 |
| 8,645,748 B1 | 2/2014 | Chepel et al. | |
| 8,732,121 B1 | 5/2014 | Zorin et al. | |
| 8,856,927 B1 | 10/2014 | Beloussov et al. | |
| 8,996,830 B1 | 3/2015 | Lyadvinsky et al. | |
| 9,003,139 B1 * | 4/2015 | Shivdeo | G06F 11/1469 711/162 |
| 9,471,441 B1 * | 10/2016 | Lyadvinsky | G06F 11/14 |
| 9,720,783 B1 * | 8/2017 | Kulkarni | G06F 11/1461 |
| 9,952,807 B1 * | 4/2018 | Kumar | G06F 11/1458 |
| 10,635,128 B1 * | 4/2020 | Guo | G06F 1/04 |
| 2003/0004952 A1 * | 1/2003 | Nixon | G05B 19/4145 |
| 2003/0070043 A1 * | 4/2003 | Merkey | G06F 11/1076 711/114 |
| 2006/0225065 A1 | 10/2006 | Chandhok et al. | |
| 2007/0265796 A1 * | 11/2007 | Taylor | G06F 17/30168 702/127 |
| 2009/0164409 A1 * | 6/2009 | Mukherjee | G06F 17/30091 |
| 2009/0172322 A1 * | 7/2009 | Gilpin | G06F 11/1456 711/162 |
| 2010/0011178 A1 | 1/2010 | Feathergill | |
| 2010/0082714 A1 * | 4/2010 | Herron | G06F 3/0676 707/822 |
| 2010/0262586 A1 * | 10/2010 | Rosikiewicz | G06F 11/1469 707/679 |
| 2011/0276806 A1 * | 11/2011 | Casper | G06F 21/78 713/189 |
| 2012/0017114 A1 * | 1/2012 | Timashev | G06F 11/1451 714/15 |
| 2012/0159232 A1 * | 6/2012 | Shimada | G06F 11/2028 714/3 |
| 2012/0233123 A1 * | 9/2012 | Shisheng | G06F 11/004 707/639 |
| 2013/0151802 A1 * | 6/2013 | Bahadure | G06F 3/0605 711/162 |
| 2013/0262801 A1 * | 10/2013 | Sancheti | G06F 3/0619 711/162 |
| 2014/0007189 A1 * | 1/2014 | Huynh | H04L 67/1095 726/3 |
| 2014/0109086 A1 * | 4/2014 | Mizrahi | G06F 9/45558 718/1 |
| 2014/0123135 A1 * | 5/2014 | Huang | G06F 9/5072 718/1 |
| 2014/0156957 A1 * | 6/2014 | Simoncelli | G06F 12/16 711/162 |
| 2014/0201365 A1 * | 7/2014 | Ashok | H04L 67/10 709/225 |

* cited by examiner

RECOVERY OF VIRTUAL MACHINE FILES USING DISK ATTACHMENT

CROSS REFERENCE TO PRIOR APPLICATIONS

This application claims priority to and the benefit of U.S. Provisional Patent Application No. 61/869,470, filed on Aug. 23, 2013; U.S. Provisional Patent Application 61/869,467, filed on Aug. 23, 2013; and U.S. Provisional Patent Application No. 61/869,480, filed on Aug. 23, 2013, the entire contents of each of which are hereby incorporated by reference. This application is related to, and hereby incorporates by reference in their entireties, the following co-owned patent applications filed on even date herewith by Applicant Acronis International GmBh: United States Patent Application entitled "Configuring Backup and Recovery Routines in a Cloud Environment" and having Ser. No. 14/320,393, filed on Jun. 30, 2014; United States Patent Application entitled "Using A Storage Path To Facilitate Disaster Recovery" and having Ser. No. 14/320,409, filed on Jun. 30, 2014; United States Patent Application entitled "Granular Recovery Using Hot-Plug Virtual Disks" and having Ser. No. 14/320,422, filed on Jun. 30, 2014; United States Patent Application entitled "Hot Recovery of Virtual Machines" and having Ser. No. 14/320,450, filed on Jun. 30, 2014; United States Patent Application entitled "Snapshotless Backup" and having Ser. No. 14/320,496, filed on Jun. 30, 2014; United States Patent Application entitled "Agentless File Backup of a Virtual Machine" and having Ser. No. 14/320,526, filed on Jun. 30, 2014; United States Patent Application entitled "Machine Replication" and having Ser. No. 14/320,540, filed on Jun. 30, 2014; United States Patent Application entitled "Data Backup Parallelization" and having Ser. No. 14/320,546, filed on Jun. 30, 2014; and United States Patent Application entitled "Systems and Methods for Backup of Virtual Machines" and having Ser. No. 14/320,555, filed on Jun. 30, 2014.

TECHNICAL FIELD

The technical field may generally relate to recovery of virtual machines and more particularly to recovery of virtual machine files.

BACKGROUND

Virtual machines may run business critical applications. An entire virtual machine or individual files or folders of the virtual machine may fail. Such failure of a virtual machine may interrupt normal availability and accessibility to the business critical applications. To restore availability and accessibility, recovery of the entire virtual machine or individual files or folders may be necessary. In some situations there may be no direct connection or available communication path between the virtual machine and the backup archive from which the virtual machine data is restored.

BRIEF SUMMARY

In an embodiment, a method for recovery of virtual machine files may include creating a backup archive file, the backup archive file including a backup of a first virtual disk corresponding to a virtual machine hosted by a virtualization host device. The method may further include storing the backup archive file including the backup. The method may also include creating a second virtual disk that emulates the first virtual disk using data from the backup archive file. The method may additionally include communicatively attaching the second virtual disk to the virtual machine hosted by the virtualization host device. Moreover, the method may include transferring data from the second virtual disk to the first virtual disk corresponding to the virtual machine hosted by the virtualization host device.

One or more of the following features may be included. The method may include recovering a file of the virtual machine hosted by the virtualization host device from the second virtual disk directly into the original virtual machine hosted by the virtualization host device. The method may further include registering the second virtual disk on the virtualization host device via the backup agent using one or more parameters included in the backup archive. The second virtual disk may be communicatively attached to the virtual machine using, at least in part, an application programming interface associated with the virtualization host device. The method may additionally include running a server service via a backup agent wherein the server service includes the storage outside the virtualization host device. Moreover, the method may include opening the second virtual disk using a plug-in for the server service to create, at least in part, a communication path between the second virtual disk and the virtualization host device.

In an embodiment, a computer program product may reside on a computer readable storage medium and may have a plurality of instructions stored on it. When executed by a processor, the instructions may cause the processor to perform operations for recovery of virtual machine files. The operations may include creating a backup archive file, the backup archive file including a backup of a first virtual disk corresponding to a virtual machine hosted by a virtualization host device. The operations may further include storing the backup archive file including the backup. The operations may also include creating a second virtual disk that emulates the first virtual disk using data from the backup archive file. The operations may additionally include communicatively attaching the second virtual disk to the virtual machine hosted by the virtualization host device. Moreover, the operations may include transferring data from the second virtual disk to the first virtual disk corresponding to the virtual machine hosted by the virtualization host device.

One or more of the following features may be included. The operations may include recovering a file of the virtual machine hosted by the virtualization host device from the second virtual disk directly into the original virtual machine hosted by the virtualization host device. The operations may further include registering the second virtual disk on the virtualization host device via the backup agent using one or more parameters included in the backup archive. The second virtual disk may be communicatively attached to the virtual machine using, at least in part, an application programming interface associated with the virtualization host device. The operations may additionally include running a server service via a backup agent wherein the server service includes the storage outside the virtualization host device. Moreover, the operations may include opening the second virtual disk using a plug-in for the server service to create, at least in part, a communication path between the second virtual disk and the virtualization host device.

In an embodiment, a computing system for recovery of virtual machine files may include one or more processors. The one or more processors may be configured to create a backup archive file, the backup archive file including a backup of a first virtual disk corresponding to a virtual machine hosted by a virtualization host device. The one or more processors may be further configured to store the backup archive file including the backup. The one or more processors may also be further configured to create a second virtual disk that emulates the first virtual disk using data from the backup archive file. The one or more processors may be additionally configured to communicatively attach the second virtual disk to the virtual machine hosted by the virtualization host device. Moreover, the one or more processors may be configured to transfer data from the second virtual disk to the first virtual disk corresponding to the virtual machine hosted by the virtualization host device One or more of the following features may be included. The one or more processors may be configured to recover a file of the virtual machine hosted by the virtualization host device from the second virtual disk directly into the original virtual machine hosted by the virtualization host device. The one or more processors may be further configured to register the second virtual disk on the virtualization host device via the backup agent using one or more parameters included in the backup archive. The second virtual disk may be communicatively attached to the virtual machine using, at least in part, an application programming interface associated with the virtualization host device. The one or more processors may also be configured to run a server service via a backup agent wherein the server service includes the storage outside the virtualization host device. The one or more processors may additionally be configured to open the second virtual disk using a plug-in for the server service to create, at least in part, a communication path between the second virtual disk and the virtualization host device.

In an embodiment, a system may include a virtualization host device running a virtual machine from a first virtual disk. The system may further include a backup agent for creating a backup archive file of the virtual machine including a backup of the first virtual disk. The system may also include a server service for storing the backup archive file. The system may additionally include a plug-in for the server service, for opening a second virtual disk that emulates the first virtual disk using data from the backup archive file, to create, at least in part, a communication path between the second virtual disk and the virtualization host device.

The details of one or more implementations are set forth in the accompanying drawings and the description below. Other features and advantages will become apparent from the description, the drawings, and the claims.

DETAILED DESCRIPTION

Overview

A cloud provider may institute backup and recovery procedures to ensure persistence of a tenant's applications, data, or other resources accessed through one or more virtual machines. For example, a backup archive or replication version of the virtual machine may be created and stored onsite or offsite and may include the entire content of the virtual machine before it failed. Efficient recovery of virtual machines may be critical for proper business operations of the cloud provider as the tenant's application demands are likely to continue in the event of a virtual machine failure. Under certain circumstances, recovery can be impeded as a result of network limitations and associated data access restrictions or unavailability.

General backup and recovery workflow may be used to get a virtual machine system (and corresponding business applications) up and running after a failure. Upon failure, systems may be recovered from previously created backups. In some situations, there may be no direct connection between the virtual machine and the backup archive where the backup data is stored due to network limitations or network infrastructure issues. The ability to recover virtual machine data in a secure environment without opening non-secure network channels may be a key business need and recovery time may be business-critical. Reducing the time between the failure or data loss and its recovery may be a primary business goal.

Recovery of virtual machine files and folders may be performed by transferring files from a backup archive to a virtual machine via a network share opened on the virtual machine side. Copying files over the network share onto the virtual machine may require the virtual machine and a recovery agent to be on the same network. This is not always possible or desirable because it may require the recovery agent to be connected to a production network, which may negatively impact production and security. For example, secured networks (e.g., in banking systems) may forbid communication with an untrusted source, which may be, for example, a recovery agent. Also, transferring large files during recovery over a production network may negatively impact network performance and slow down business-related processes in the same network.

In view of the forgoing, there may be a need for a system in which the backup data is restored from inside the virtualization host or virtual machine itself without using a network share. Such a system may overcome network limitations and network infrastructure issues and also may enable an increase in recovery speed. In various implementations, the techniques and features described in the present disclosure are directed towards virtual machine file and folder recovery and may overcome network limitations in virtual machine recovery. In one or more embodiments of the present disclosure, techniques and features for virtual machine disk attachment may be described and may improve recovery of virtual machine files and folders in virtual machines hosted on virtualization hosts such as, and for example, VMware ESX(i), Microsoft Hyper-V, and XEN. A virtual machine disk may be communicatively attached to a virtualization host to restore some or all of a VM therefrom and for other purposes as described herein.

Figure 1:
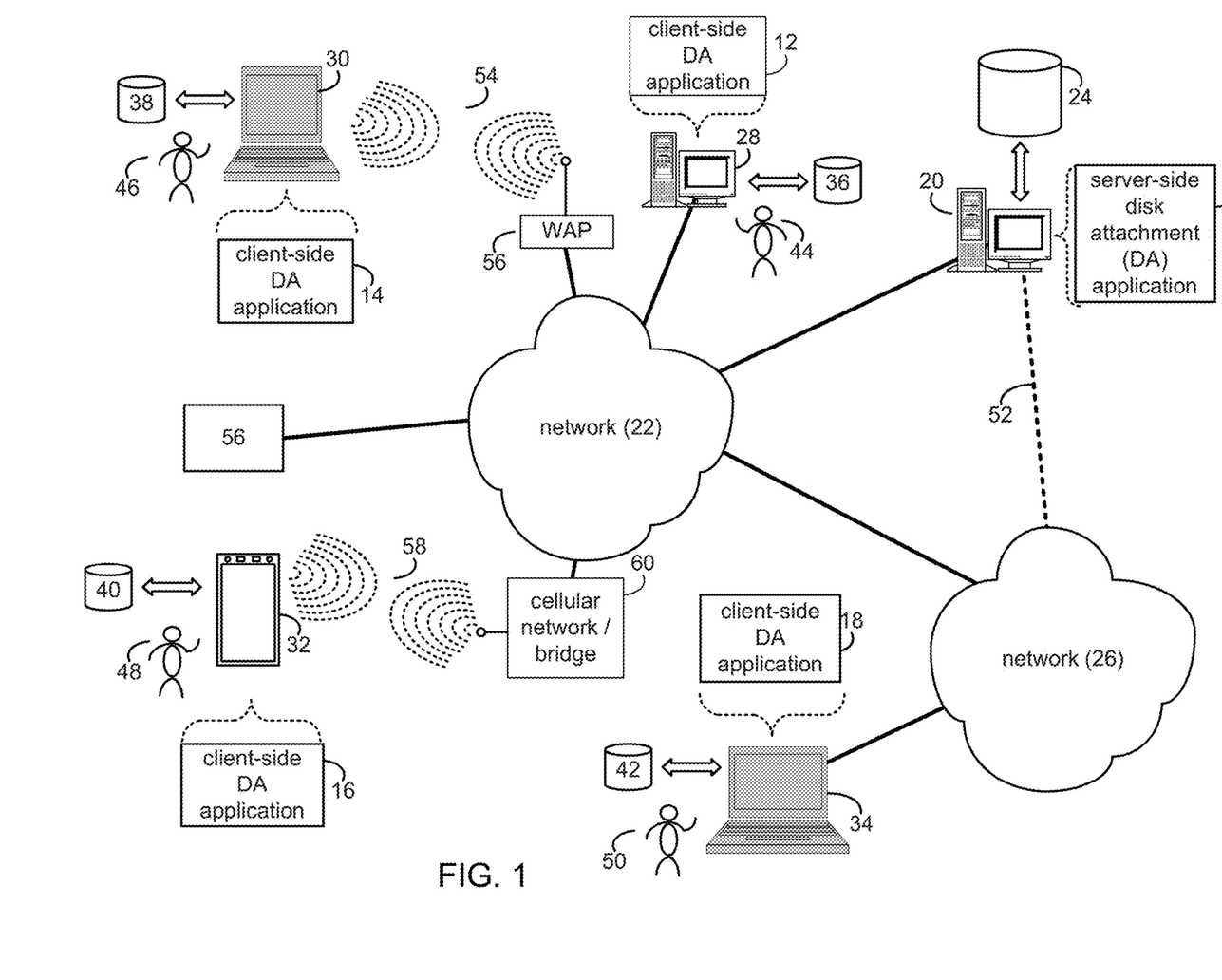
FIG. 1 depicts an example system that can execute implementations of the present disclosure.

Referring to FIG. 1, there is shown a server-side disk attachment (DA) application 10 and client-side DA applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as disk attachment process 10. Further, one or more of client applications 12, 14, 16, and 18 may be referred to as a process configured to carry out one or more of the features described herein, such as disk attachment processes 12, 14, 16, and/or 18.

Figure 2:
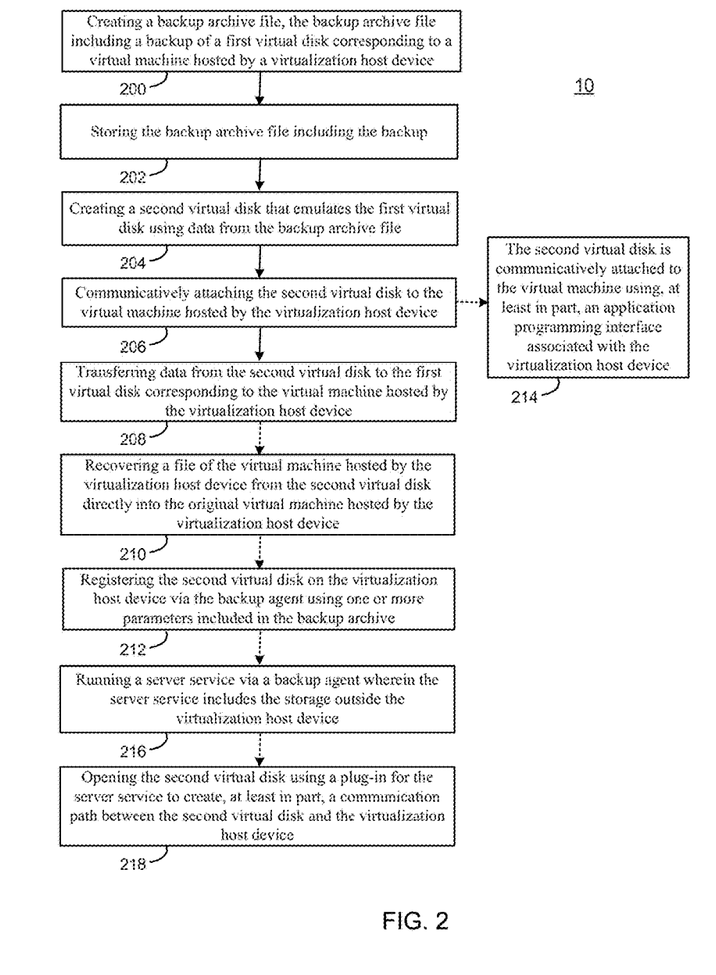
FIG. 2 is a flowchart illustrating an example process for recovery of virtual machine files in accordance with the present disclosure.

As will be discussed below and referring now to FIG. 2, disk attachment process or method 10 may create 200 a backup archive file. The backup archive file may include a backup of a first virtual disk corresponding to a virtual machine hosted by a virtualization host device. Disk attachment process 10 may also 202 store the backup archive file including the backup. Disk attachment process 10 may further create 204 a second virtual disk that emulates the first virtual disk using data from the backup archive file. Disk attachment process 10 may additionally communicatively attach 206 the second virtual disk to the virtual machine hosted by the virtualization host device. Moreover, disk attachment process 10 may transfer 208 data from the second virtual disk to the first virtual disk corresponding to the virtual machine hosted by the virtualization host device.

The disk attachment process may be a server-side process (e.g., server-side disk attachment process 10), a client-side process (e.g., client-side disk attachment process 12, client-side disk attachment process 14, client-side disk attachment process 16, or client-side disk attachment process 18), or a hybrid server-side/client-side process (e.g., a combination of server-side disk attachment process 10 and one or more of client-side disk attachment processes 12, 14, 16, 18).

System Overview

Referring to FIG. 1, server-side disk attachment process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side disk attachment process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side disk attachment processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side disk attachment processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side disk attachment processes 12, 14, 16, 18 and/or server-side disk attachment process 10 may be processes that run within (i.e., are part of) a cloud computing site, cloud computing application, cloud platform, or cloud environment. Alternatively, client-side disk attachment processes 12, 14, 16, 18 and/or server-side disk attachment process 10 may be stand-alone applications that work in conjunction with the cloud computing site, cloud computing application, cloud platform, or cloud environment. One or more of client-side disk attachment processes 12, 14, 16, 18 and server-side disk attachment process 10 may interface with each other (via network 22 and/or network 26).

Users 44, 46, 48, 50 may access server-side disk attachment process 10 directly through the device on which the client-side disk attachment process (e.g., client-side disk attachment processes 12, 14, 16, 18) is executed, namely client electronic devices 28, 30, 32, 34, for example. Users 44, 46, 48, 50 may access server-side disk attachment process 10 directly through network 22 and/or through secondary network 26. Further, server computer 20 (i.e., the computer that executes server-side disk attachment process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Disk Attachment Process

For the following discussion, server-side disk attachment process 10 will be described for illustrative purposes and server computer 20 may run server-side disk attachment application 10 to carry out some or all of the techniques and features described here. It should be noted that server-side disk attachment process 10 may interact with client-side disk attachment process 12 and may be executed within one or more applications that allow for communication with client-side disk attachment process 12. However, this is not intended to be a limitation of this disclosure, as other configurations are possible (e.g., stand-alone, client-side disk attachment processes and/or stand-alone server-side disk attachment processes). For example, some implementations may include one or more of client-side disk attachment processes 12, 14, 16, and 18 in place of or in addition to server-side disk attachment process 10.

The systems and methods (e.g., disk attachment process 10) described herein relate to the recovery of virtual machines and/or virtual machine files or folders. In part, the systems and methods relate to decreasing the recovery time period for restoring a virtual machine or virtual machine files and/or folders and, more specifically, overcoming network limitations or infrastructure issues causing a lack of direct communication between the virtual machine or virtualization host device and the backup archive where backup data may be stored.

The systems described herein may include one or more memory elements for backup of software, databases, and virtual machines, and computer storage products including instructions to be executed by a processor to cause the processor to implement the methods described herein.

Figure 3:
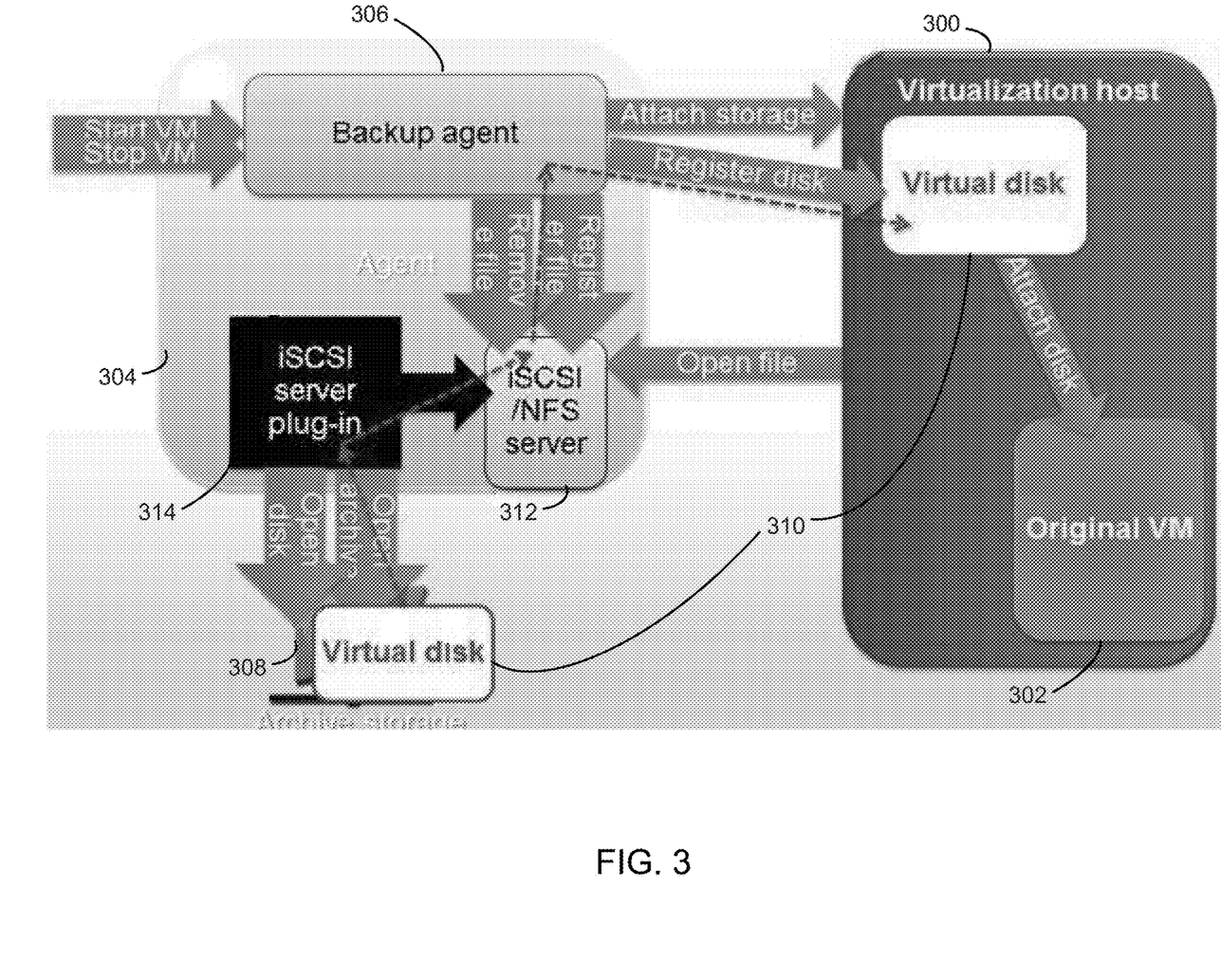
FIG. 3 also depicts an example system that can execute implementations of the present disclosure.

Referring now to FIG. 1, one or more of users 44, 46, 48, and 50 may be cloud administrators at a cloud provider or may be cloud end-users. Referring now also to FIG. 3, the cloud administrators may access and administer virtualization host device 300 or virtual machine 302 through one or more of server computer 20 or client electronic devices 28, 30, 32, 34 (respectively). Backup agent 306 may represent one or more of server-side disk attachment application 10 and client-side disk attachment applications 12, 14, 16, and 18. Virtualization host device 300 may include virtual machine 302, which may run a cloud or virtualization application such as VMWare™ or may include a bare-metal embedded hypervisor (e.g. VMware™ ESX™ and VMware™ ESXi™). Further, virtualization host device 300 may include a vCloud™ architecture that may enhance cooperation between hypervisors. Disk attachment process 10 may include or work in connection with agent 304, which may include or may be configured to perform any number of the techniques or features described herein.

Disk attachment process 10 and/or agent 304 may include backup agent 306. Further, disk attachment process 10 and/or agent 304 may include a software component, executable code, function, subroutine, or other set of instructions designed to carry out one or more operations for disk attachment. Disk attachment process 10 may coordinate the disk attachment process and, in an embodiment, may require a separate machine where it can be run. This machine may be, for example, a virtual appliance, a Windows/Linux virtual machine, or a Windows/Linux physical machine, where the executable code of disk attachment process 10 can be executed. In an implementation, agent 304 may be a separate machine (e.g., a virtual appliance or separate Windows VM or separate physical machine) which may run backup agent 306.

Virtual machine 302 may be the machine that runs, for example, business critical applications for which virtual machine files and/or folders may need to be recovered. Referring now to FIGS. 1-3, in an embodiment, disk attachment process 10 may create 200 a backup archive file. The backup archive file (e.g., backup archive file 308) may include backup of a first virtual disk corresponding to a virtual machine (e.g., virtual machine 302) hosted by a virtualization host device (e.g., virtualization host device 300). In an implementation, backup archive file 308 may include a disk image. Backup archive file 308 may be created by agent 304. Agent 304 may run on virtualization host 300 or may run on a separate machine (e.g., a machine running an operating system such as Windows™).

Further, disk attachment process 10 may store 202 the backup archive file (e.g., backup archive file 308) including the backup. In various implementations, the backup archive file may be stored in storage inside or outside the virtualization host device (e.g., virtualization host device 300). Disk attachment process 10 may also create the backup or disk image of the first virtual disk, which may be part of backup archive file 308. Backup archive file 308 may store user data and archive metadata and may contain multiple disk images from different systems or virtual machines. The disk image of a virtual disk may only be part of the backup archive file. Additionally, disk attachment process 10 may create 204 a second virtual disk (e.g., virtual disk 310). Virtual disk 310 may emulate the first virtual machine disk using data from the backup archive file. The backup archive file contents may be opened through backup agent 306. Backup agent 306 may view or access the contents of the archive as a set of files (e.g., as virtual disk) and may also transfer this view or access to external entities such as virtualization host device 300.

Virtualization host device 300 may include a file system datastore which may be based on VMFS (virtual machine file system). The datastore may include one or more virtual disks which may be a virtual machine disk (VMDK or .vmdk) file. The virtual disk may be a single disk file including the constituent data for an entire virtual machine (e.g., virtual source machine 302). The file system datastore may be a logical representation of the storage provided by virtualization host device 300.

As discussed above, virtualization host device 300 and/or virtual machine 302 may not have network access to backup archive file 308 or virtual disk 310 for performance reasons, security reasons, or other network issues. In order to provide virtualization host device 300 and/or virtual machine 302 access to backup archive file 308 or virtual disk 310 so that files and folders of virtual machine 302 may be recovered, disk attachment process 10 and/or agent 304 (through, e.g., backup agent 306) may execute a virtual disk mounting workflow or process such that virtual disk 310 becomes mounted (i.e., communicatively attached) to virtual machine 302.

For example, NFS/iSCSI server 312 may run on agent 304 and may provide a share or logical unit number (LUN). The LUN may identify a storage device addressed by a SCSI or iSCSI protocol, which may be attached as a datastore to virtualization host device 300. Backup agent 306 may emulate a .vmdk disk on the storage device, such that it also appears on the datastore. This emulation may serve as a link to the contents of the backup archive file or image and backup agent 306 may handle this transaction from the backup archive to the created datastore. The .vmdk disk from this datastore may then be transparently (e.g., via embedded virtualization host functionality) attached to the virtual machine (i.e., using an attach disk feature), such that the virtual machine can view or access the contents of the .vmdk disk.

Further, and for example, disk attachment process 10 may run 216 a server service via a backup agent (e.g., backup agent 306). The server service may include storage outside (i.e., server service storage) the virtualization host device (virtualization host device 300). The server service may be, for example, an iSCSI or NFS server service. iSCSI may refer to internet small computer system interface and may be an internet protocol (IP) based standard for connecting or linking different storage devices. iSCSI may be used to send SCSI (small computer system interface) commands over IP networks. SCSI may be a standard that defines how computers can communicate with other devices, such as printers, scanners, and storage devices. By using SCSI, computers can send and receive information to and from other SCSI devices. In this way, iSCSI may be used to send data over and between local area networks, wide area networks, and/or the Internet. NFS may refer to network file system, which may be a file system protocol that allows client devices to access files over a network similar to how the client device would access local files.

Continuing with the example above, disk attachment process 10 may create and attach the server service storage (e.g., iSCSI or NFS storage) to virtualization host device 300 and may provide a server service storage address to virtualization host device 300. Virtualization host device 300 may contact or attempt to access the referred file (i.e., virtual disk 310). Further, disk attachment process 10 may open 218 the second virtual disk (e.g., virtual disk 310) using a plug-in for the server service to create, at least in part, a communication path between the second virtual disk (e.g., virtual disk 310) and the virtualization host device (e.g., virtualization host device 300). The plug-in (e.g., plug-in 314) for the server service may be, for example, an iSCSI server plug-in configured to operate with an iSCSI server (e.g., iSCSI server 312). In an embodiment, the plug-in for the server service may be an NFS server plug-in configured to operate with an NFS server (e.g., NFS server 312). The plug-in maybe a module which may be part of agent 304 and may allow interaction between the iSCSI/NFS server and the backup archive file contents. The iSCSI or NFS server plug-in may run on the computer (e.g., server computer 20) that runs agent 304.

Further, disk attachment process 10 may register 212 the second virtual disk (e.g., virtual disk 310) on the virtualization host device (e.g., virtualization host device 300) via the backup agent (e.g., backup agent 306) using one or more parameters included in the backup archive (e.g., backup archive file 308). The virtual disk may be added to an inventory (e.g., a vSphere inventory via an add-to-inventory feature). The virtual disk may be added as it existed at the moment of the backup (e.g., the same disk geometry, ID and other parameters which may be stored in the archive file metadata). Virtual disk 310 may now be ready to be mounted or communicatively attached to virtual machine 302. Disk attachment process 10 may communicatively attach 206 the second virtual disk (e.g., virtual disk 310) to the virtual machine (e.g., virtual machine 302) hosted by the virtualization host device (e.g., virtualization host device 300). The term "communicatively attaching" may refer to making a disk available to the virtualization host device so that it can be used as a disk by a virtual machine running on the host.

For example, the second virtual disk (e.g., virtual disk 310) may be communicatively attached (214) to the virtual machine (e.g., virtual machine 302) using, at least in part, an application programming interface associated with the virtualization host device (e.g., virtualization host device 300). In an implementation, a VixSoap API or VDDK API may be used.

Disk attachment process 10 may also initiate the process of recovering files and folders of the original virtual machine (e.g., virtual machine 302, which was previously backed up in backup archive file 308). For example, the virtual machine 302 may be powered on and a guest operating system may be loaded. Virtual machine 302 may be accessed by backup agent 306 to initialize the second virtual disk (e.g., virtual disk 310) in the guest operating system running on virtual machine 302. Any files or folders that may be required for recovery may be transferred to the original (i.e., first) virtual disk of virtual machine 302 from the communicatively attached (i.e., second) virtual disk 310. In this way, disk attachment process 10 may transfer 208 data from the second virtual disk (e.g., virtual disk 310) to the first virtual disk corresponding to the virtual machine (e.g., virtual machine 302) hosted by the virtualization host device (e.g., virtualization host device 300). Once recovery is finished, the mounted or communicatively attached disk (e.g., virtual disk 310) may be demounted or detached and unregistered from the virtualization host (e.g., virtualization host device 300).

Figure 4:
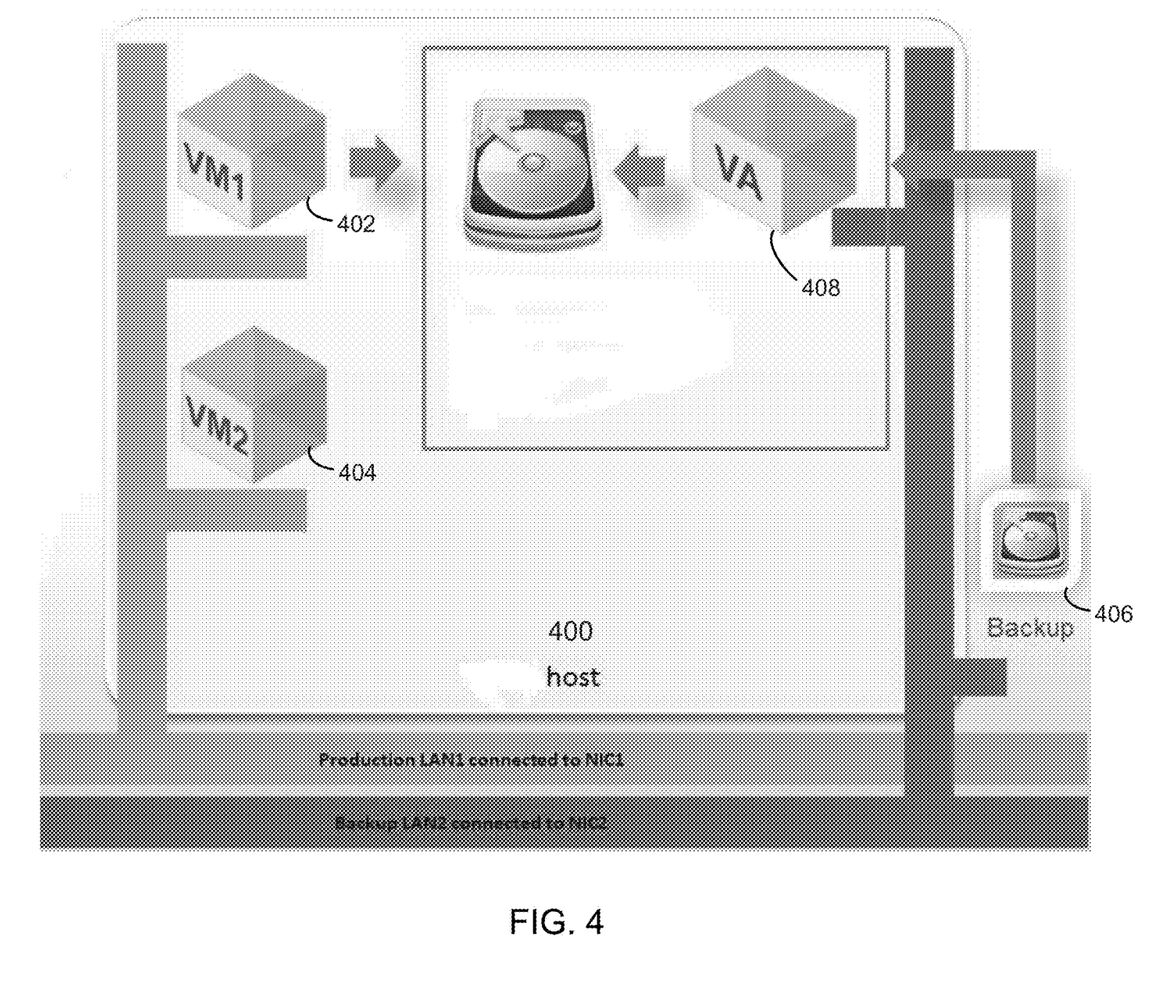
FIG. 4 also depicts an example system that can execute implementations of the present disclosure.

In an embodiment, the production network and backup network associated with the virtual machine may be separate. In some situations (but not all), in order to run a recovery, it may be necessary to copy the backup file to another machine accessible to both the production and backup networks. Referring now to FIG. 4, as discussed above, a virtualization host device (e.g., virtualization host 400) and/or virtual machine (e.g., virtual machines 402 and/or 404) may not have network access to a backup archive file (e.g., stored at storage device 406) for security or network infrastructure reasons. For example, as shown in FIG. 4, Production LAN1 and Backup LAN2 may have no connection between them for security reasons. Thus, there may be no impact on Production LAN1 from Backup LAN2. However, using the techniques and features described in the present disclosure, a virtual disk from backup 406 may be emulated on a virtual appliance (e.g., virtual appliance 408) and communicatively attached to, e.g., virtual machine 402. The virtual appliance may be similar to the agent with the iSCSI or NFS server service and plug-in discussed above. In an implementation, the Production NIC1 and Backup NIC2 may be physical network cards attached to the virtualization host. These network cards may be attached to different cables (i.e., different switches and therefore networks).

The techniques and features described here may allow, for example, disk attachment process 10 to recover 210 a file of the virtual machine (e.g., virtual machine 302) hosted by the virtualization host device (e.g., virtualization host device 300) from the second virtual disk (e.g., virtual disk 310) directly into the original virtual machine (e.g., virtual machine 302) hosted by the virtualization host device (e.g., virtualization host device 300). In an implementation, the file may be in application file associated with a business critical application running on the virtual machine.

Figure 5:
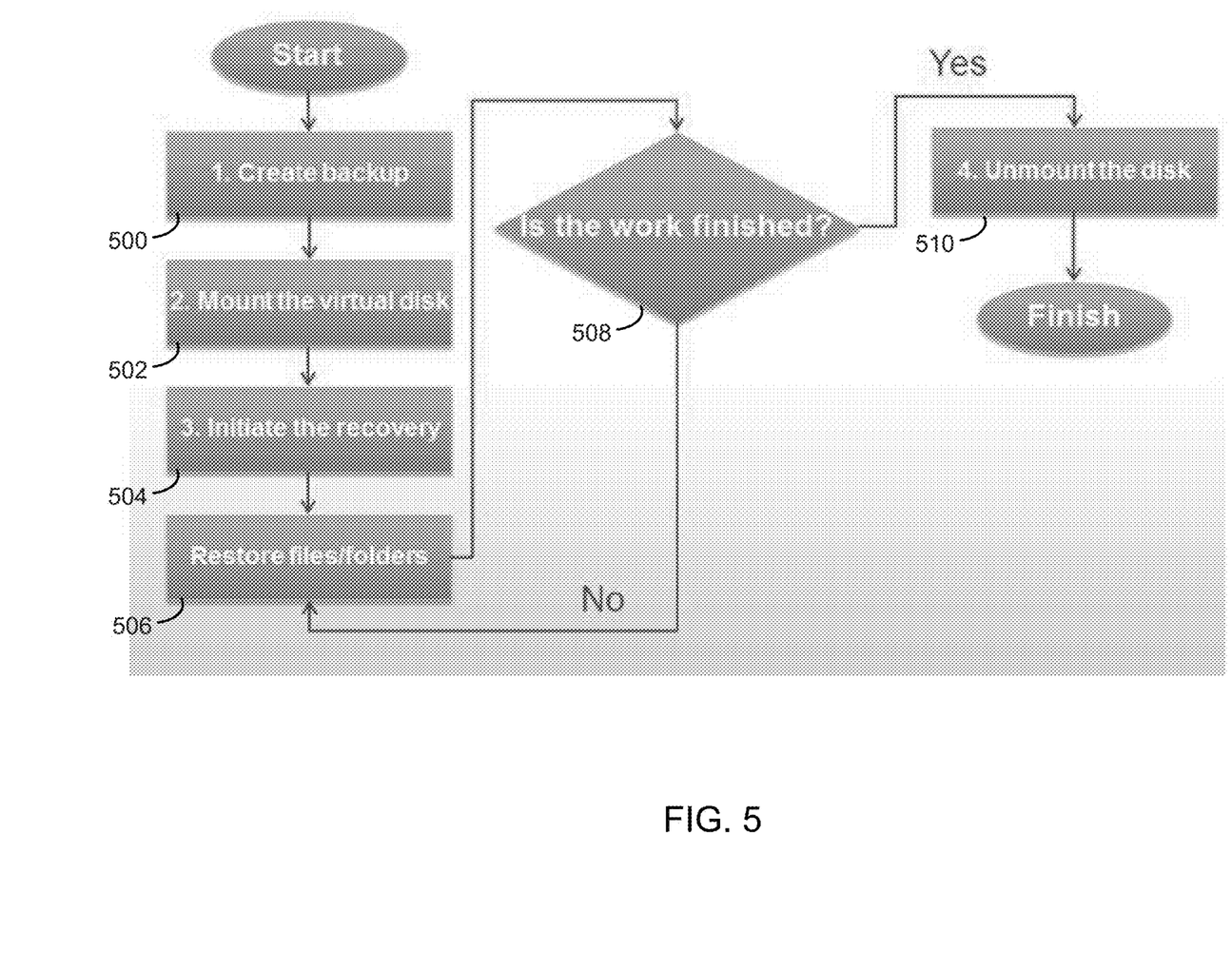
FIG. 5 is also a flowchart illustrating an example process for recovery of virtual machine files in accordance with the present disclosure.

Referring now also to FIG. 5, in an embodiment, a backup of a virtual machine may be created (500). For example, backup archive file 308 of virtual machine 302 may be created. Further, a virtual disk may be mounted (502) to the virtual machine. For example, virtual disk 310 may be communicatively attached to virtual machine 302. Also, a recovery may be initiated (504) and files and/or folders of the virtual machine may be restored (506). For example, files and/or folders of virtual machine 302 may be restored from virtual disk 310 to virtual machine 302. If all the required files and folders have been restored from virtual disk 310 to virtual machine 302 (e.g., if the work is finished (508)), virtual disk 310 may be un-mounted (510) from virtual machine 302. If all the required files and/or folders have not been restored from virtual disk 310 to virtual machine 302 (e.g., if the work is not finished (508)) files and/or folders of virtual machine 302 may continue to be be restored from virtual disk 310 to virtual machine 302 until complete and virtual disk 310 may then be un-mounted (510) from virtual machine 302.

The techniques and features described in the present disclosure may improve the speed of recovery of virtual machines because recover may be done primarily by copying data between the virtual machine disks (i.e., the initial local virtual disk and the attached virtual disk which includes the data to be restored). Further, the techniques and features described in the present disclosure may improve reliability and security in the recovery of virtual machines because they may eliminate the need to configure firewalls to allow recovery of files into a virtual machine (i.e. open additional ports to be used for recovery).

Without the techniques and features described herein, it may be necessary to have an agent running at the virtual machine or virtualization host in order to execute a backup and recovery. However, using the disk attachment technique described herein may allow administrators to avoid having an agent at the (production) virtual machine or virtualization host and avoid using extra resources for the agent. By attaching a separate virtual disk, the techniques and features described here may ensure that file permissions and attributes (which may be lost if files are transferred over a shared network) are maintained during recovery. Here, using an emulated disk, files may be copied from the emulated disk to the original virtual machine disk while maintaining file attributes and without losing file permissions whereas if the files are copied over a shared network the file permissions may be lost.

In an embodiment, the emulated disk (e.g., the second virtual disk) may be created by Acronis™ Software. The emulated disk may emulate a virtual machine datastore and may be viewed by the virtual machine as a usual disk. This technique may use NFS technology to make the emulated disk, which may not be native to many virtualization software systems. The production virtual machine may see the emulated disk as a local disk. Further, this technique may lessen impact on the production virtual machine during file recovery and preserve file permissions. There may be a backup agent in the virtual appliance (emulated disk), and, in an embodiment, the emulated disk may be a small virtual machine itself.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for recovery of virtual machine files comprising:
   creating a backup archive file, the backup archive file including a backup of a first virtual disk corresponding to a virtual machine hosted by a virtualization host device, wherein the virtual machine is connected to a production network;
   storing the backup archive file including the backup of the first virtual disk in a storage device in electronic communication with the virtualization host device;
   emulating the first virtual disk using data from the backup archive file by creating a second virtual disk, using a backup agent, wherein the second virtual disk is connected to a backup network, wherein the production network and the backup network are not connected;
   communicatively attaching the second virtual disk to the virtual machine hosted by the virtualization host device using, at least in part, an application programming interface associated with the virtualization host device;
   recovering the first virtual disk by transferring data from the second virtual disk to the first virtual disk corresponding to the virtual machine hosted by the virtualization host device;

registering the second virtual disk on the virtualization host device via the backup agent using one or more parameters included in the backup archive file; and opening the second virtual disk using a plug-in to create, at least in part, a communication path between the second virtual disk and the virtualization host device.

2. The method of claim 1, further comprising:

recovering a file of the virtual machine hosted by the virtualization host device from the second virtual disk directly into the virtual machine hosted by the virtualization host device.

3. The method of claim 1, further comprising:

running a server service via a backup agent wherein the server service includes storage outside the virtualization host device.

4. A computer program product residing on a non-transitory computer readable storage medium having a plurality of instructions stored thereon, which, when executed by a processor, cause the processor to perform operations for recovery of virtual machine files, the operations comprising:

creating a backup archive file, the backup archive file including a backup of a first virtual disk corresponding to a virtual machine hosted by a virtualization host device, wherein the virtual machine is connected to a production network;

storing the backup archive file including the backup of the first virtual disk;

creating, using a backup agent, a second virtual disk that emulates the first virtual disk using data from the backup archive file, wherein the second virtual disk is connected to a backup network;

registering the second virtual disk on the virtualization host device via the backup agent using one or more parameters included in the backup archive file;

mounting the second virtual disk;

running a server service via a backup agent wherein the server service includes the storage outside the virtualization host device;

opening the second virtual disk using a plug-in for the server service to create, at least in part, a communication path between the second virtual disk and the virtualization host device, wherein the communication path is not connected to the production network;

communicatively attaching the second virtual disk to the virtual machine hosted by the virtualization host device such that the second virtual disk is registered on the virtualization host device via a backup agent using one or more parameters included in the backup archive file; and recovering the first virtual disk by transferring data from the second virtual disk to the first virtual disk corresponding to the virtual machine hosted by the virtualization host device.

5. The computer program product of claim 4, wherein the operations further comprise:

recovering a file of the virtual machine hosted by the virtualization host device from the second virtual disk directly into the virtual machine hosted by the virtualization host device.

6. The computer program product of claim 4, wherein the second virtual disk is communicatively attached to the virtual machine hosted by the virtualized host device using, at least in part, an application programming interface associated with the virtualization host device.

7. A computing system for recovery of virtual machine files, the computing system comprising one or more processors, wherein the one or more processors are configured to:

create a backup archive file, the backup archive file including a backup of a first virtual disk corresponding to a virtual machine hosted by a virtualization host device, wherein the virtual machine is connected to a production network;

store the backup archive file including the backup of the first virtual disk;

create, using a backup agent, a second virtual disk that emulates the first virtual disk using data from the backup archive file, wherein the second virtual disk is connected to a backup network;

mounting the second virtual disk;

opening the second virtual disk using a plug-in for a server service to create, at least in part, a communication path between the second virtual disk and the virtualization host device, wherein the communication path is not connected to the production network;

communicatively attach the second virtual disk to the virtual machine hosted by the virtualization host device such that the second virtual disk is registered on the virtualization host device via the backup agent using one or more parameters included in the backup archive file, wherein the second virtual disk is communicatively attached to the virtual machine hosted by the virtualized host device using, at least in part, an application programming interface associated with the virtualization host device;

recover the first virtual disk by transferring data from the second virtual disk to the first virtual disk corresponding to the virtual machine hosted by the virtualization host device; and unregister the second virtual disk from the virtualization host device.

8. The computing system of claim 7, wherein the one or more processors are further configured to:

recover a file of the virtual machine hosted by the virtualization host device from the second virtual disk directly into the virtual machine hosted by the virtualization host device.

9. The computing system of claim 7, wherein the one or more processors are further configured to:

run a server service via a backup agent wherein the server service includes storage outside the virtualization host device.

10. The computing system of claim 9, wherein the one or more processors are further configured to:

open the second virtual disk using a plug-in for the server service to create, at least in part, a communication path between the second virtual disk and the virtualization host device.

\* \* \* \* \*